(12) United States Patent
Meier

(10) Patent No.: US 7,818,788 B2
(45) Date of Patent: Oct. 19, 2010

(54) WEB APPLICATION SECURITY FRAME

(75) Inventor: John D. Meier, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 11/353,821

(22) Filed: Feb. 14, 2006

(65) Prior Publication Data
US 2007/0199050 A1    Aug. 23, 2007

(51) Int. Cl.
*H04L 9/00* (2006.01)
(52) U.S. Cl. .............................. 726/4; 726/18; 726/23; 726/25; 726/26
(58) Field of Classification Search ................... 726/18, 726/23, 25, 26
See application file for complete search history.

(56) References Cited

U.S. PATENT DOCUMENTS

| | | |
|---|---|---|
| 5,107,499 A | 4/1992 | Lirov |
| 5,446,680 A | 8/1995 | Sekiya et al. |
| 5,751,949 A | 5/1998 | Thomson et al. |
| 5,812,780 A | 9/1998 | Chen et al. |
| 6,067,412 A | 5/2000 | Blake et al. |
| 6,167,521 A | 12/2000 | Smith et al. |
| 6,209,101 B1 | 3/2001 | Mitchem et al. |
| 6,256,773 B1 | 7/2001 | Bowman-Amuah |
| 6,377,994 B1 | 4/2002 | Ault |
| 6,408,391 B1 | 6/2002 | Huff et al. |
| 6,457,040 B1 | 9/2002 | Mizuhara et al. |
| 6,584,569 B2 | 6/2003 | Reshef et al. |
| 6,609,100 B2 | 8/2003 | Smith |
| 6,631,473 B2 | 10/2003 | Townsend |
| 6,643,775 B1 | 11/2003 | Granger |
| 6,668,325 B1 | 12/2003 | Collberg |
| 6,742,143 B2 | 5/2004 | Kaler et al. |
| 6,782,425 B1 | 8/2004 | Germscheid et al. |
| 6,816,886 B2 | 11/2004 | Elvanoglu et al. |
| 6,836,845 B1 | 12/2004 | Lennie et al. |

(Continued)

FOREIGN PATENT DOCUMENTS

WO    WO 98/53399    11/1998

(Continued)

OTHER PUBLICATIONS

James B.D. Joshi/Walid G. Aref/ Arif Ghafor/ Eugene H. Spafford, Security Models For Web-Based Applications, Feb. 2001 (pp. 38-44).*

(Continued)

*Primary Examiner*—Kieu Oanh Bui
*Assistant Examiner*—Michael Anderson
(74) *Attorney, Agent, or Firm*—Workman Nydegger

(57) ABSTRACT

A web application security frame (e.g., schema) that can incorporate expertise into an engineering activity, for example, a threat modeling activity, is provided. The novel web application security frame component can be applied to a threat modeling component to converge knowledge into the activity by identifying categories, vulnerabilities, threats, attacks and countermeasures. The novel schema can create a common framework that converges knowledge with respect to any application engineering activity (e.g., threat modeling, performance modeling). Additionally, a context precision mechanism can be employed to automatically and/or dynamically determine a context of a web application environment. This context can be used to automatically generate an appropriate web application security frame component.

13 Claims, 9 Drawing Sheets

U.S. PATENT DOCUMENTS

| | | | |
|---|---|---|---|
| 6,850,985 | B1 | 2/2005 | Giloi et al. |
| 6,912,502 | B1 | 6/2005 | Buddle |
| 6,915,454 | B1 | 7/2005 | Moore et al. |
| 6,959,393 | B2 | 10/2005 | Hollis et al. |
| 6,971,026 | B1 | 11/2005 | Fujiyama |
| 6,980,927 | B2 | 12/2005 | Tracy et al. |
| 6,981,281 | B1 | 12/2005 | LaMacchia et al. |
| 6,985,946 | B1 | 1/2006 | Vasandani et al. |
| 6,993,448 | B2 | 1/2006 | Tracy et al. |
| 6,996,845 | B1 | 2/2006 | Hurst et al. |
| 7,000,219 | B2 | 2/2006 | Barrett |
| 7,013,395 | B1 | 3/2006 | Swiler et al. |
| 7,032,114 | B1 | 4/2006 | Moran |
| 7,096,502 | B1 | 8/2006 | Fox |
| 7,219,304 | B1 | 5/2007 | Kraenzel |
| 7,231,661 | B1 | 6/2007 | Villavicencio |
| 7,249,174 | B2 | 7/2007 | Srinivasa |
| 7,343,626 | B1* | 3/2008 | Gallagher .................... 726/25 |
| 7,370,359 | B2 | 5/2008 | Hrabik |
| 2002/0007229 | A1 | 1/2002 | Hudson |
| 2002/0078380 | A1 | 6/2002 | Lin |
| 2002/0144128 | A1 | 10/2002 | Rahman et al. |
| 2002/0161903 | A1 | 10/2002 | Besaw |
| 2003/0005326 | A1 | 1/2003 | Flemming |
| 2003/0014644 | A1 | 1/2003 | Burns et al. |
| 2003/0033516 | A1 | 2/2003 | Howard et al. |
| 2003/0120938 | A1 | 6/2003 | Mullor |
| 2003/0172292 | A1 | 9/2003 | Judge |
| 2003/0217277 | A1 | 11/2003 | Narayanan |
| 2003/0233431 | A1 | 12/2003 | Reddy |
| 2003/0233571 | A1 | 12/2003 | Kraus |
| 2004/0003286 | A1 | 1/2004 | Kaler et al. |
| 2004/0103200 | A1 | 5/2004 | Ross et al. |
| 2004/0139353 | A1 | 7/2004 | Forcade |
| 2004/0205711 | A1 | 10/2004 | Ishimitsu |
| 2004/0221163 | A1 | 11/2004 | Jorgensen et al. |
| 2004/0230831 | A1 | 11/2004 | Spelman et al. |
| 2004/0260754 | A1 | 12/2004 | Olson et al. |
| 2005/0004863 | A1 | 1/2005 | Havrilak |
| 2005/0015591 | A1 | 1/2005 | Thrash et al. |
| 2005/0015752 | A1 | 1/2005 | Alpern et al. |
| 2005/0022003 | A1 | 1/2005 | Oliphant |
| 2005/0022021 | A1 | 1/2005 | Bardsley et al. |
| 2005/0022172 | A1 | 1/2005 | Howard |
| 2005/0039046 | A1 | 2/2005 | Bradsley et al. |
| 2005/0044405 | A1 | 2/2005 | Spraggs |
| 2005/0044418 | A1 | 2/2005 | Miliefsky et al. |
| 2005/0055565 | A1 | 3/2005 | Fournet |
| 2005/0091227 | A1 | 4/2005 | McCollum et al. |
| 2005/0102536 | A1 | 5/2005 | Patrick |
| 2005/0120231 | A1 | 6/2005 | Harada et al. |
| 2005/0125272 | A1 | 6/2005 | Hostetler |
| 2005/0131978 | A1 | 6/2005 | Meredith et al. |
| 2005/0138426 | A1 | 6/2005 | Styslinger |
| 2005/0144471 | A1 | 6/2005 | Shupak et al. |
| 2005/0182941 | A1 | 8/2005 | Della-Libera et al. |
| 2005/0182969 | A1 | 8/2005 | Ginter et al. |
| 2005/0188221 | A1 | 8/2005 | Motsinger et al. |
| 2005/0190769 | A1 | 9/2005 | Smith |
| 2005/0198332 | A1 | 9/2005 | Laertz et al. |
| 2005/0198520 | A1 | 9/2005 | Bardsley et al. |
| 2005/0234926 | A1 | 10/2005 | Warner |
| 2005/0246716 | A1 | 11/2005 | Smith et al. |
| 2005/0246776 | A1 | 11/2005 | Chawro et al. |
| 2005/0273860 | A1 | 12/2005 | Chess |
| 2005/0283622 | A1 | 12/2005 | Hall |
| 2005/0283831 | A1 | 12/2005 | Ryu et al. |
| 2006/0161989 | A1* | 7/2006 | Reshef et al. ................. 726/26 |
| 2006/0206615 | A1* | 9/2006 | Zheng et al. ................ 709/229 |
| 2006/0230430 | A1* | 10/2006 | Hondo et al. .................... 726/1 |
| 2006/0236394 | A1* | 10/2006 | Morrow et al. ................ 726/23 |
| 2006/0265740 | A1* | 11/2006 | Clark et al. ..................... 726/8 |
| 2006/0277606 | A1* | 12/2006 | Yunus et al. .................. 726/25 |
| 2006/0282891 | A1* | 12/2006 | Pasko .......................... 726/23 |
| 2007/0016955 | A1 | 1/2007 | Goldberg |
| 2007/0156375 | A1 | 7/2007 | Meier |
| 2007/0156420 | A1 | 7/2007 | Meier |
| 2007/0157156 | A1 | 7/2007 | Meier |
| 2007/0157311 | A1 | 7/2007 | Meier |
| 2007/0162890 | A1 | 7/2007 | Meier |
| 2007/0192344 | A1 | 8/2007 | Meier |
| 2007/0204346 | A1 | 8/2007 | Meier |
| 2007/0289009 | A1 | 12/2007 | Phan-Anh |
| 2008/0098479 | A1 | 4/2008 | O'Rourke |

FOREIGN PATENT DOCUMENTS

| | | |
|---|---|---|
| WO | WO0056027 A1 | 9/2000 |
| WO | WO03101069 A1 | 12/2003 |

OTHER PUBLICATIONS

Adding Application Security. http://www.technicalinfo.net/opinions/opinion024.html, last accessed on Nov. 15, 2005, 2 pages.

Chadwick, D.; Threat Modelling for Active Directory; 10 pages.

Connie U. Smith et al., Performance Engineering Evaluation of Object-Oriented Systems with SPE•ED™, Computer Performance Evaluation: Modelling Techniques and Tools, No. 1245, Springer-Verlag, Berlin, 1997, 21 pages.

Connie U. Smith et al., Software Performance Engineering: A Case Study Including Performance Comparison with Design Alternatives, IEEE Transactions on Software Engineering, Jul. 1993, pp. 720-741, vol. 19, No. 7.

D. Snow and W. Chang, Network security. http://ieeexplore.ieee.org/search/srchabstract.jsp?arnumber=267863&isnumber=6694&punumber=630&k2dockey=267863@ieeecnfs&query=%28network+security%29%3Cin%3Emetadata&pos=8.

Desmet, L., et al.; Threat Modelling for Web Services Based Web Applications; 14 pages.

Dunn, M.; Cyber-Threats and Countermeasures Towards an Analytical Framework for Explaining Threat Politics in the Information Age; Aug. 2004; 35 pages.

FortiGate™ series of ASIC-accelerated multi-threat security systems. http://www.fortinet.com/products/.

Gerald A. Marin, Network security basics, Basic Training, IEEE Security & Privacy, Published by the IEEE Computer Society, Nov./Dec. 2005. http://ieeexplore.ieee.org/search/srchabstract.jsp?arnumber=1556540&isnumber=33104&punumber=8013&k2dockey=1556540@ieeejrns&query=%28network+security%29%3Cin%3Emetadata&pos=6.

J.D. Meier et al., Threat Modeling Web Applications, May 2005. http://msdn.microsoft.com/library/default.asp?url=/library/en-us/dnpag2/html/tmwa.asp, last accessed on Nov. 15, 2005, 6 pages.

Jiang Tao, et al., The research on dynamic self-adaptive network security model based on mobile agent, National Engineering Research Center for Computer Software, 308 mailbox of Northeastern University, Shen yang, 110006, China. http://ieeexplore.ieee.org/search/srchabstract.jsp?arnumber=885909&isnumber=19142&punumber=7108&k2dockey=885909@ieeecnfs&query=%28network+security%.

Jon Oltsik, Information Security Brief, Apr. 2005. http://www.appsecinc.com/news/APPSECINC_April.pdf, 3 pages.

Meier, J., et al.; Chapter 2—Threats and Countermeasures: Improving Web Application Security; Jun. 2003, 22 pages; http://msdn.microsoft.com/library/default.asp?url=/library/en-us/dnnetsec/html/THCMCh02.asp; last viewed May 1 2006.

MSDN. "Chapter 1—Fundementals of Engineering for Performance". http://msdn.microsoft.com/library/en-us/dnpag/html/scalenetchapt01.asp?frame=true last viewed Dec. 1, 2006, 9 pages.

Security in a Web Services World: A Proposed Architecture and Roadmap, Apr. 7, 2002. http://msdn.microsoft.com/library/default.asp?url=/library/en-us/dnwssecur/html/securitywhitepaper.asp, last accessed on Nov. 15, 2005, 20 pages.

Simonetta Balsamo et al., Deriving Performance Models from Software Architecture Specifications, viewed at http://www.dsi.unive.it/~balsamo/saladin/bal-sim.2.01.pdf, 6 pages.

Stephen S. Yau, An Integrated Life-Cycle Model for Software Maintenance, IEEE Transactions on Software Engineering, Aug. 1988, pp. 1128-1144, vol. 14, No. 8.

Tadashi Ohta and Tetsuya Chikaraishi, Network security model, ATR Communication Systems Research Laboratories, 2-2, Hikaridai, Seika-cho, Soraku-gun, Kyoto 619-02, Japan. http://ieeexplore.ieee.org/search/srchabstract.jsp?arnumber=515640&isnumber=11283&punumber=3866&k2dockey=515640@ieeecnfs&query=%28network+security%29%3Cin%3Emetadata&pos=1.

Kudo, et al.; XML Document Security based on Provisional Authorization; 2000; 10 pages.

Joshi, et al.; Security models for Web-based applications ; 2001; 7 pages.

Hondo, et al.; Securing Web services; 2002; 12 pages.

Brose; Securing Web Services with SOAP Security Proxies; 4 pages.

Patterns and Practices Security Engineering Explained; 2 pages; http://msdn.microsoft.com/library/default.asp?url=/library/en-us/dnpag2/html/scccngexplained.asp; last viewed Mar. 29, 2005.

Meier,J.D., et al; Patterns and Practices Security Index; Aug. 2005; 5 pages; http://msdn.microsoft.com/library/default.asp?url=/library/en-us/dnpag2/html/securityengindex.asp.

Meier,J.D., et al; Patterns and Practices Web Application Security Engineering Index; Aug. 2005; 4 pages; http://msdn.microsoft.com/1ibrary/default.asp?url=/library/en-us/dnpag2/html/WebAppSecurityEngIndex.asp last viewed Mar. 29, 2005.

Meier,J.D., et al; Patterns and Practices Security Deployment Review Index; Aug. 2005; 2 pages; http://msdn.microsoft.com/1ibrary/en-us/dnpag2/html/SecurityDeploymentReviewIndex.asp. Last viewed Mar. 29, 2005.

".Net Framework Security", by Meier et al., Microsoft Corporation, Jun. 2003.

Smith, "Designing High Performance Distributed Application s Using Software Performance Engineering: A Tutorial." Performance Engineering Services 1996.

Wiederhold "The Roles of Artificial Intelligence in Information Systems", Hounal of Intelligent Information Systems. 1992.

L. Liu et al., Security and Privacy Requirements Analysis within a Social Setting, Proceedings of the 11th IEEE Joint International Congerence on Requirements Engineering (RE), Sep. 8-12, 2003, pp. 151-161.

R. Crook et al., Security Requirements Engineering: When Anti-Requirements Hit the Fan, Proceedings of the IEEE Joint International Conference on Requirements Engineering (RE'02), IEEE Computer Society, 2002, 3 Pages.

Office Action dated Feb. 11, 2008 cited in U.S. Appl. No. 11/321,153 (Copy Attached).

Office Action dated Mar. 6, 2009 cited in U.S. Appl. No. 11/321,153 (Copy Attached).

Office Action dated Mar. 19, 2008 cited in U.S. Appl. No. 11/382,857 (Copy Attached).

Office Action dated Oct. 17, 2008 cited in U.S. Appl. No. 11/382,857 (Copy Attached).

Office Action dated Mar. 6, 2009 cited in U.S. Appl. No. 11/382,857 (Copy Attached).

Office Action dated Jun. 23, 2008 cited in U.S. Appl. No. 11/321,818 (Copy Attached).

Office Action dated Mar. 24, 2009 cited in U.S. Appl. No. 11/321,818 (Copy Attached).

Office Action dated May 15, 2009 cited in U.S. Appl. No. 11/321,425 (Copy Attached).

Office Action dated Aug. 4, 2009 cited in U.S. Appl. No. 11/382,858 (Copy Attached).

Office Action dated Dec. 5, 2008 cited in U.S. Appl. No. 11/321,818 (Copy Attached).

Office Action dated Jun. 22, 2009 cited in U.S. Appl. No. 11/353,821 (Copy Attached).

Office Action dated Sep. 10, 2009 cited in U.S. Appl. No. 11/363,142 (Copy Attached).

Meier,J.D., et al.; Cheat Sheet: Web Application Security Frame; May 2005; 6 pages; http://msdn.microso ft.com/1library/default.asp?url=/library/en-us/dnpag2/htmITMWAcheatsheet.asp.

Meier,J.D., et al.; Improving Web Application Security: Threats and Countermeasures; Jun. 2003; 6 pages; http://msdn.microsoft.com/library/default.asp?url=/library/en-us/dnnetsec/html/ThreatCounter.asp last viewed Mar. 29, 2005.

"Performance and Scalability of Distributed Software Architectures: An SPE Approach", Smith et al., CiteSeer 2002.

Microsoft Corporation; Patterns and Practices Security Engineering Explained; Oct. 2005; 4 pages; http://msdn.microsoft.com/library/default.asp?url=/library/en-us/dnpag2/html/scccngexplained.asp.

Papaefstathiou, Design of a Perfomance Technology Infrastructure to Support the Construction of Responsice Software. Microsoft Sep. 26, 2000.

Devanbu, et al., Software Engineering for Security: a Roadmap. ACM 2000.

Office Action dated Jun. 11, 2008 cited in U.S. Appl. No. 11/382,861 {Copy Attached}.

Office Action dated Dec. 4, 2008 cited in U.S. Appl. No. 11/382,861 {Copy Attached}.

Office Action dated Jun. 12, 2009 cited in U.S. Appl. No. 11/382,861 {Copy attached}.

Office Action dated Sep. 14, 2009 cited in U.S. Appl. No. 11/321,153 {Copy Attached}.

Office Action dated Nov. 25, 2009 cited in U.S. Appl. No. 11/321,425 (Copy Attached).

Office Action dated Dec. 9, 2009 cited in U.S. Appl. No. 11/321,818 (Copy Attached).

Office Action dated Jan. 7, 2010 cited in U.S. Appl. No. 11/382,857 (Copy Attached).

Office Action dated Jan. 11, 2010 cited in U.S. Appl. No. 11/382,858 (Copy Attached).

Meier,J.D., et al., Security Engineering Explained; 2005; 51 pages.

Notice of Allowance dated Jan. 29, 2010 cited in U.S. Appl. No. 11/363,142 (Copy Attached).

Office Action dated Jan. 26, 2010 cited in U.S. Appl. No. 11/382,861 (Copy Attached).

Office Action dated Mar. 2, 2010 cited in U.S. Appl. No. 11/321,425 (Copy Attached).

Fox "Performance Engineering as a Part of the Development Life Cycle for Large-Scale Software Systems", 1989, ACM, 10 pages.

U.S. Appl. No. 11/382,861, filed May 25, 2010, Office Action.

Office Action dated Apr. 28, 2010 cited in U.S. Appl. No. 11/382,858 (Copy Attached).

Office Action dated Apr. 28, 2010 cited in U.S. Appl. No. 11/321,153 (Copy Attached).

Verkamo et al., "Measuring Design Diagrams for Product Quality Evaluation" Jul. 9, 2001, 10 pages.

* cited by examiner

WEB APPLICATION SECURITY FRAME

BACKGROUND

Analysis of software systems with respect to security and performance has proven to be extremely useful to development requirements and to the design of systems. As such, it can be particularly advantageous to incorporate security engineering and analysis into the software development life cycle from the beginning stages of design. Conventionally, the application life cycle lacks security engineering and analysis thereby prompting retroactive measures to address identified security attacks and issues.

Today, when developing an application, it is oftentimes difficult to predict how the application will react under real-world conditions. In other words, it is difficult to predict security vulnerabilities of an application prior to and during development and/or before completion. Frequently, upon completion, a developer will have to modify the application in order to adhere to real-world conditions and threats of attacks. This modification can consume many hours of programming time and delay application deployment—each of which is very expensive.

Traditionally, designing for application security is oftentimes random and does not produce effective results. As a result, applications and data associated therewith are left vulnerable to threats and uninvited attacks. In most cases, the typical software practitioner lacks the expertise to effectively predict vulnerabilities and associated attacks.

While many threats and attacks can be estimated with some crude level of certainty, others cannot. For those security criterions that can be estimated prior to development, this estimate most often requires a great amount of research and guesswork in order to most accurately determine the criterion. The conventional guesswork approach of security analysis is not based upon any founded benchmark. As well, these conventional approaches are not effective or systematic in any way.

Rather, conventional security approaches are base upon a trial-and-error mechanism. In other words, traditional systems tend to be reactive as users lack the expertise necessary to formulate a proactive security mechanism. As such, these traditional trial-and-error approaches lead to costly interruptions and expensive programming time in order to rectify issues as they arise.

In summary, traditional application life cycle development approaches do not proactively (and accurately) address security issues from the beginning to the end of the life cycle. To the contrary, developers often find themselves addressing security and performance issues after the fact—after development is complete. This retroactive modeling approach is extremely costly and time consuming to the application life cycle.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises mechanism that can incorporate expertise into a web-based application engineering activity. More particularly, a web-based application frame or schema can be generated and applied to a threat modeling component. The web application security frame can be applied to a web-based application decomposition component, a threat identifier component and/or a vulnerability identifier component to assist in organizing and grouping vulnerability, threat/attack and countermeasure information. It is a novel feature of the innovation to generate a web application security frame that can converge knowledge into an engineering activity (e.g., threat modeling) by identifying categories, vulnerabilities, threats/attacks and countermeasures.

In another aspect, a context precision mechanism can be employed to automatically and/or dynamically determine a context of a web-based application environment. In accordance therewith, web application security frame component can be established based at least in part upon the context. Essentially, the context precision concept can be described as a novel tool that can clarify guidance and product design by defining a set of categories that facilitates highly relevant, highly specific guidance and actions with respect to a particular web application.

In disparate particular aspects, dimensions of the context precision mechanism can be directed to web application types, scenarios, project types, life cycles, etc. Accordingly, the context precision component can evaluate a web application environment to determine the application type, for example, is it an e-commerce application? Using these dimensions, very specific guidance can be generated and incorporated into a web application security frame component.

Still another aspect of the innovation employs an artificial intelligence (AI) component that infers an action that a user desires to be automatically performed. More particularly, an AI component can be provided and employ a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
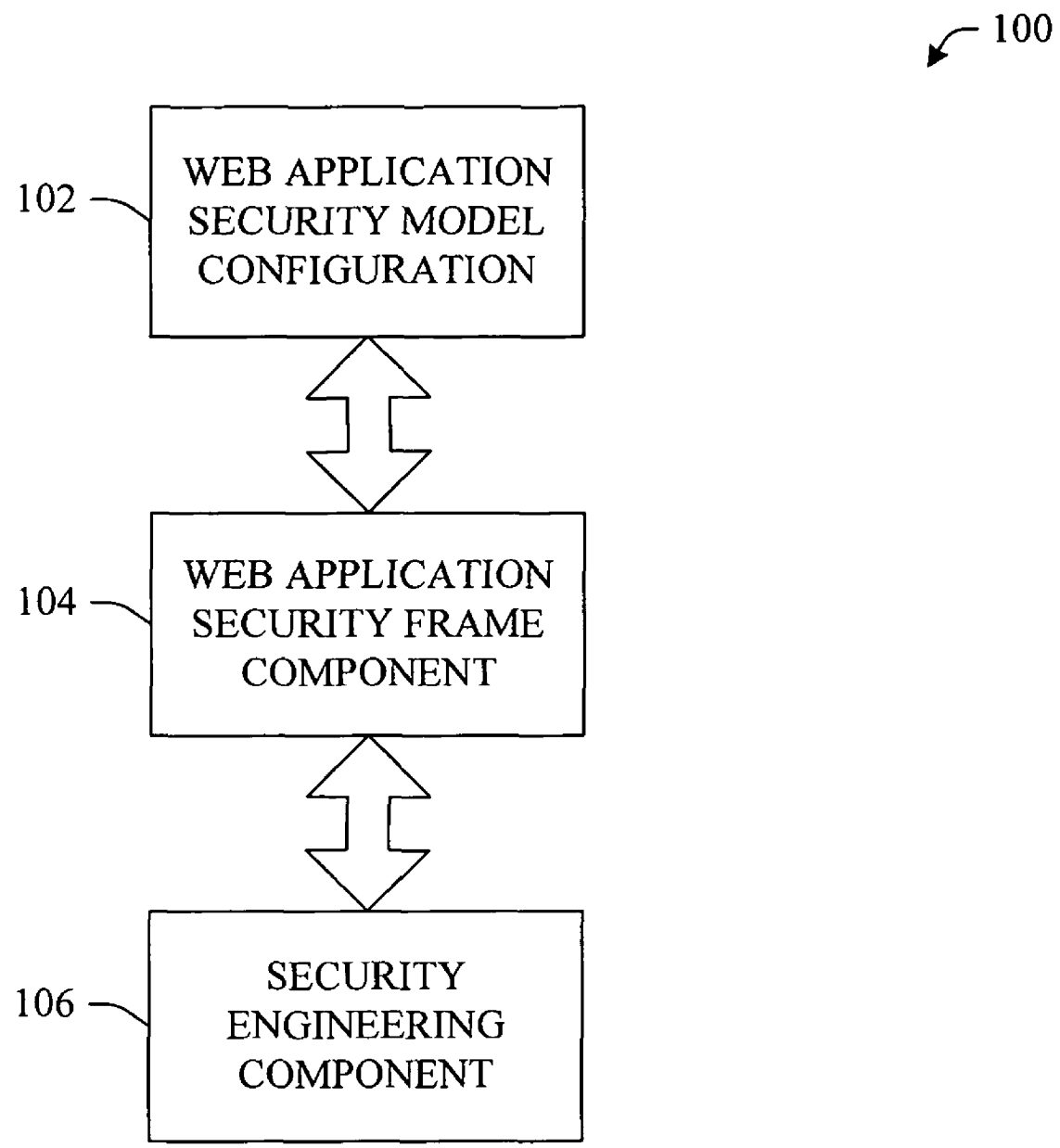
FIG. 1 illustrates a system that facilitates generating and employing web application security frame component in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the figures, FIG. 1 illustrates a system 100 that facilitates providing configuring and providing a web application security frame (e.g., schema, template, model) in accordance with an aspect of the innovation. Generally, system 100 includes web application model configuration component 102 that facilitates generation of web application security frame component 104. The web application model configuration component 104 can enable identification of specific factors (e.g., categories, vulnerabilities, threats/actions counter measures) to be defined, formatted into a web application security frame component 104 and input into a security engineering component 106.

By way of example, it will be understood that the security engineering component 106 can facilitate a novel engineering technique in order to identify threats, attacks, vulnerabilities and/or countermeasures. The novel web application security frame component 104 can enable a user to incorporate and leverage expertise into a web application life cycle. The novel functionality and advantages thereof will be better understood upon a review of the figures that follow.

In one aspect, the web application security frame 104 is a pattern-based information model that defines a set of security-related categories specifically for the web application that is being designed. Most often, these categories represent the areas where security issues are most often made and/or overlooked. As will be understood upon a review of the figures that follow, the web application security frame component 104 can be employed to leverage expertise not shared by the common user. In other words, the web application security frame component 104 can incorporate categories, vulnerabilities, threats/attacks and countermeasures which have been identified by extremely experienced developers through research and testing.

In one particular aspect, the subject innovation can provide a web application security frame component 104 (e.g., schema, template) that identifies and explains a set of application layer vulnerabilities and threats/attacks and defines countermeasures (e.g., remedies) that are appropriate to address each threat/attack. To this end, the novel web application security frame component 104 can facilitate categorization of issues (e.g., vulnerabilities/threats) in preparation for performing life cycle engineering tasks such as threat and/or security modeling.

The innovation described herein can facilitate analysis of web application security from the perspectives of vulnerabilities, threats, attacks and countermeasures associated therewith. The following terms are used throughout the description, the definitions of which are provided herein to assist in understanding various aspects of the subject innovation.

An "asset" refers to a resource of value such as the data in a database or a file system, or a system resource. In another example, an asset might be an intangible resource or value such as a company's reputation.

A "threat" refers to an undesired event or a potential occurrence—malicious or otherwise—that may harm or compromise an asset.

A "vulnerability" refers to a weakness that makes an exploit (e.g., attack) possible. Vulnerabilities can include operational practices.

An "attack" (or "exploit") refers to an action taken that utilizes one or more vulnerabilities to realize a threat.

A "countermeasure" refers to a safeguard that addresses a threat and mitigates risk. However, a countermeasure does not always directly address threats. Rather, a countermeasure addresses the factors that define threats. For example, a countermeasure can range from improving application design, or improving code, to improving an operational practice.

As described above, the web application security frame component 104 of the subject innovation can identify a set of common application level threats, and the recommended countermeasures to address each one. Although this description does not contain an exhaustive list of threats, vulnerabilities and/or countermeasures, it is to be understood that it does highlight many top threats. With this information and knowledge of how an attacker works, a user can identify additional threats. In other words, the novel web application security frame 104 can enable a user to identify vulnerabilities and threats that are most likely to impact a web application.

While there are many variations of specific attacks and attack techniques, it can be particularly useful to view threats in terms of what the attacker is trying to achieve. In other words, focus can be shifted from the identification of every specific attack to focusing on the end results of possible attacks. Threats faced by the application can be categorized based on the goals and purposes of the attacks. A working knowledge of these categories of threats can help organize a security strategy so that preparation can be made with respect to responses to threats.

In one aspect particular categories of threat types can be employed. For example, STRIDE is an acronym that can be used to categorize different threat types. More particularly, STRIDE is an acronym for the following:

Spoofing refers to an act of attempting to gain access to a system by using a false identity. This can be accomplished using stolen user credentials or a false IP address. After the attacker successfully gains access as a legitimate user or host, elevation of privileges or abuse using authorization can begin.

Tampering is the unauthorized modification of data, for example as it flows over a network between two computers.

Repudiation is the ability of users (legitimate or otherwise) to deny that they performed specific actions or transactions. Without adequate auditing, repudiation attacks are difficult to prove.

Information disclosure is the unwanted exposure of private data, for example, a user views the contents of a table or file he or she is not authorized to open, or monitors data passed in plaintext over a network. Some examples of information disclosure vulnerabilities include the use of hidden form fields, comments embedded in web pages that contain database connection strings and connection details, and weak exception handling that can lead to internal system level details being revealed to the client. Any of this information can be very useful to the attacker.

Denial of service is the process of making a system or application unavailable. For example, a denial of service attack might be accomplished by bombarding a server with requests to consume all available system resources or by passing it malformed input data that can crash an application process.

Elevation of privilege occurs when a user with limited privileges assumes the identity of a privileged user to gain privileged access to an application. For example, an attacker with limited privileges might elevate his or her privilege level to compromise and take control of a highly privileged and trusted process or account.

Figure 2:
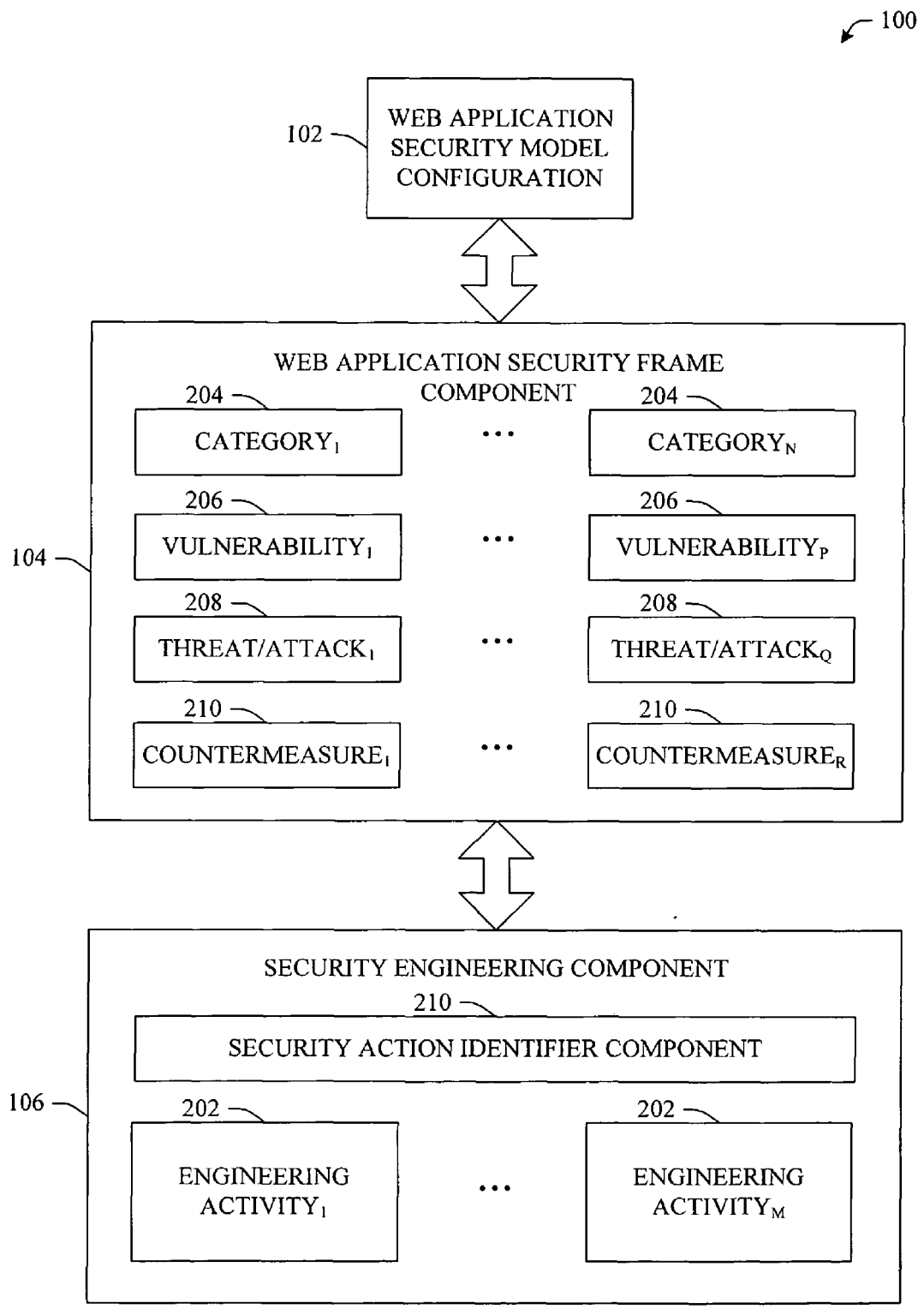
FIG. 2 illustrates a system that employs a web application security frame component having multiple categories, vulnerabilities, threats/attacks and countermeasures defined in accordance with a novel security modeling system.

Referring now to FIG. 2, an alternative block diagram of system 100 is shown. More particularly, as illustrated, the security engineering component 106 can include 1 to M engineering activity components. These 1 to M engineering activity components can be referred to individually or collectively as engineering activity components 202. As described above, in one aspect, a threat modeling activity can be employed which refers to an engineering mechanism that can identify threats, attacks, vulnerabilities and countermeasures in accordance with web application life cycles.

Additionally, as shown, web application security frame component 104 can include 1 to N category components 204, 1 to P vulnerability components 206, 1 to Q threat/activity components 208, and 1 to R countermeasure components 210. Each of these web application security frame subcomponents (204, 206, 208, 210) will be better understood upon a review of the figures that follow.

Figure 3:
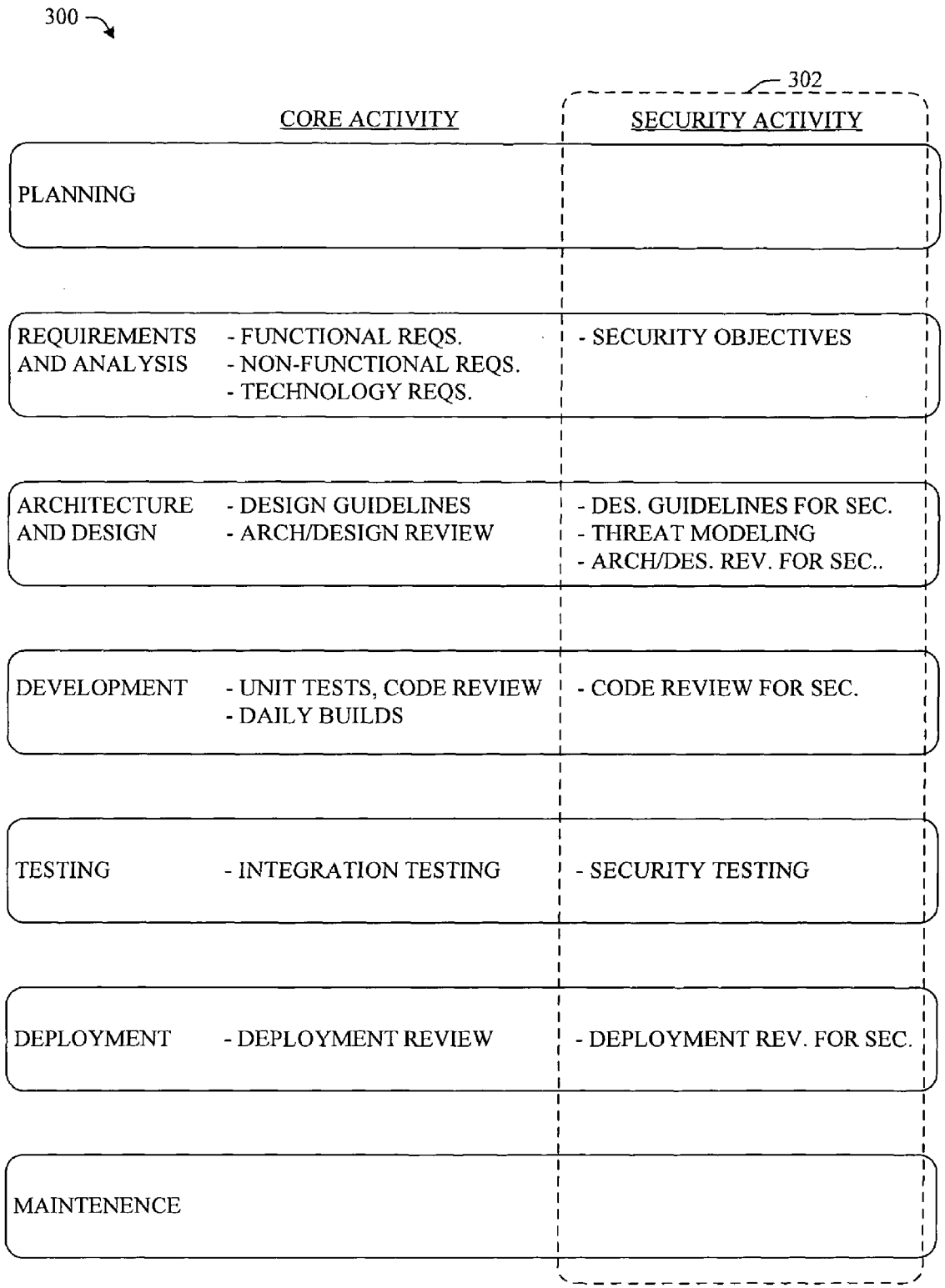
FIG. 3 illustrates an exemplary list of activities of a security engineering system in accordance with the novel innovation.

Referring again to the engineering activity components 202 and with reference to FIG. 3, for instance, as the example described herein is directed to a security scenario, in a security engineering environment, the novel web application security frame concepts can be employed in connection with a number of security engineering activities related to a web application life cycle. As shown in FIG. 3, the security engineering life cycle can include a set of proven security-focused activities 302. Expertise can be incorporated into each of these activities through the use of the novel web application security frame component 104 described herein.

Although the aspects described herein are directed to a security engineering implementation, (e.g., threat modeling), it is to be understood that the concepts similar to the novel web application security frame functionalities can be applied to other engineering models and activities associated therewith. By way of example, the novel concepts of leveraging expertise through the use of a novel information model can be applied to a performance engineering model. More particularly, the novel web application security frame mechanisms can be applied to the performance modeling activity of a web application life cycle.

Moreover, it is to be understood and appreciated that the subject security engineering model of FIG. 3 can facilitate the ability to bake security into the application life cycle. In doing so, security focus can be added to the following common security engineering activities:

Identifying security objectives;
Design guidelines for security;
Threat modeling;
Architecture and design review for security;
Code review for security;
Security testing; and
Deployment review for security.

With reference again to FIG. 2, each issue (e.g., threat) category described by STRIDE can have a corresponding set of countermeasure techniques (e.g., remedies) that can be used to reduce, rectify and/or mitigate risk. With specific reference to a web application life cycle, these categories 204, vulnerabilities 206, threats 208 and countermeasures 210 are described in greater detail infra. It is to be understood that the appropriate countermeasure 210 can depend upon the specific attack encountered or detected. Although specific, categories 204, vulnerabilities 206, threats 208, attacks 208, and countermeasures 210 that apply at the web application levels are presented herein, it is to be understood that others exist. These additional categories, vulnerabilities, threats, attacks and countermeasures are to be included within the scope of this disclosure and claims appended hereto.

Referring first to web application security frame categories 204, below is an exemplary list of categories 204 in accordance with an aspect of the innovation. While the exemplary categories illustrate a particular grouping, it is to be understood the groupings can be organized in a different manner without departing from the spirit and scope of the innovation and claims appended hereto in any way.

Following is a table that summarizes exemplary categories 204 that can be represented within a novel web application security frame 104 in accordance with an aspect of the innovation.

| Category 204 | Description |
| --- | --- |
| Input and Data Validation | how do you know that the input that the application receives is valid and safe? Input validation refers to how the application filters, scrubs, or rejects input before additional processing. Should data be trusted from sources such as data bases |

-continued

| Category 204 | Description |
|---|---|
| | and file shares? |
| Authentication | Who are you? |
| | Authentication is the process where an entity proves the identity of another entity, typically through credentials, such as, a user name and password. |
| Authorization | What can you do? |
| | Authorization is how the application provides access controls for resources and operations. |
| Configuration Management | Who does your application run as? |
| | Which databases does it connect to? |
| | How is your application administered? |
| | How are these settings secured? |
| | Configuration management refers to how the application handles these operational issues. |
| Sensitive Data | How does your application handle sensitive data? |
| | Sensitive data refers to how your application handles any data that must be protected either in memory, over the network, or in persistent stores. |
| Session Management | How does your application handle and protect user sessions? |
| | A session refers to a series of related interactions between a user and the Web application. |
| Cryptography | How are you keeping secrets (confidentiality)? |
| | How are you tamper-proofing your data or libraries (integrity)? |
| | How are you providing seeds for random values that must be cryptographically strong? |
| | Cryptography refers to how the application enforces confidentiality and integrity. |
| Exception Management | When a method call in your application fails, what does the application do? |
| | How much do you reveal? |
| | Do you return friendly error information to end users? |
| | Do you pass valuable exception information back to the caller? |
| | Does your application fail gracefully? |
| Auditing and Logging | Who did what and when? |
| | Auditing and logging refer to how the application records security-related events. |

The following table illustrates an exemplary list of vulnerabilities 206 that correspond to the aforementioned categories 204. Again, as mentioned above, this list is not intended to be exhaustive or limiting in any way. Other vulnerabilities exist and are to be included within the scope of this disclosure and claims appended hereto.

| Category 204 | Vulnerability 206 |
|---|---|
| Input and Data Validation | Using non-validated input in a hypertext markup language (HTML) output stream. |
| | Using non-validated input to generate queries (e.g., SQL queries). |
| | Using input file names, URLs, or user names for security decisions. |
| | Using application-only filters for malicious input. |
| | Looking for known bad patterns or input. |
| | Trusting data read from databases, file shares, and other network resources. |
| | Failing to validate input from all sources including cookies, query string parameters, HTTP headers, databases and network resources. |
| Authentication | Using weak passwords. |
| | Storing clear text credentials in configuration files. |
| | Passing clear text credentials over the network. |
| | Permitting over-privileged accounts. |
| | Permitting prolonged session lifetime. |
| | Mixing personalization with authentication. |
| Authorization | Relying on a single gatekeeper. |
| | Failing to lock down system resources against application entities. |
| | Failing to limit database access to specified stored |

-continued

| Category 204 | Vulnerability 206 |
|---|---|
| | procedures. |
| | Using inadequate separation of privileges. |
| Configuration Management | Using insecure administration interfaces. |
| | Using insecure configuration stores. |
| | Storing clear text configuration data. |
| | Having too many administrators. |
| | Using over-privileged process accounts and service accounts. |
| Sensitive Data | Storing secrets when you do not need to. |
| | Storing secrets in code. |
| | Storing secrets in clear text. |
| | Passing sensitive data in clear text over networks. |
| Session Management | Passing session identifiers over unencrypted channels. |
| | Permitting prolonged session lifetime. |
| | Having insecure session state stores. |
| | Placing session identifiers in query strings. |
| Cryptography | Using custom cryptography. |
| | Using the wrong algorithm or a key size that is too small. |
| | Failing to secure encryption keys. |
| | Using the same key for a prolonged period of time. |
| | Distributing keys in an insecure manner. |
| Exception Management | Failing to use structured exception handling. |
| | Revealing too much information to the client. |
| Auditing and Logging | Failing to audit failed logons. |
| | Failing to secure audit files. |
| | Failing to audit across application tiers. |

One particularly useful method of analyzing web application-level threats/attacks 208 is to organize them by category 204. The table below summarizes an exemplary set of threats/attacks 208 with reference to each category 204 identified above.

| Category (204) | Threats/Attacks (208) |
|---|---|
| Input and Data Validation | Buffer overflow. |
| | Cross-site scripting. |
| | SQL injection. |
| | Canonicalization. |
| | Query string manipulation. |
| | Cookie manipulation. |
| | HTTP header manipulation. |
| Authentication | Network eavesdropping. |
| | Brute force attacks. |
| | Dictionary attacks; |
| | Cookie replay attacks. |
| | Credential theft. |
| Authorization | Elevation of privilege. |
| | Disclosure of confidential data. |
| | Data tampering. |
| | Luring attacks. |
| Configuration Management | Unauthorized access to administration interfaces. |
| | Unauthorized access to configuration stores. |
| | Retrieval of clear text configuration data. |
| | Lack of individual accountability. |
| | Over-privileged process and service accounts. |
| Sensitive Data | Accessing sensitive data in storage. |
| | Accessing sensitive data in memory (including process dumps). |
| | Network eavesdropping. |
| | Information disclosure. |
| Session Management | Session hijacking. |
| | Session replay. |
| | Man in the middle attacks. |
| Cryptography | Loss of decryption keys. |
| | Encryption cracking. |
| Exception management | Revealing sensitive system or application details. |
| | Denial of service attacks. |
| Auditing and logging | User denies performing an operation. |
| | Attacker exploits an application without trace. |
| | Attacker covers his/her tracks. |

In accordance with the exemplary categories 204, vulnerabilities 206 and threats/attacks 208, the following table illustrates exemplary countermeasures 210 that can be included within the novel web application security frame component 104.

| Category (204) | Countermeasures (210) |
|---|---|
| Input and Data Validation | Do not trust input.<br>Validate input: length, range, format, and type.<br>Constrain, reject, and sanitize input.<br>Encode output. |
| Authentication | Use strong password policies.<br>Do not store credential.<br>Use authentication mechanisms that do not require clear text credentials to be passed over the network.<br>Encrypt communication channels to secure authentication tokens.<br>Use HTTPS only with forms authentication cookies.<br>Separate anonymous from authenticated pages. |
| Authorization | Use least privilege accounts.<br>Consider granularity of access.<br>Enforce separation of privileges.<br>Use multiple gatekeepers.<br>Secure system resources against system identities. |
| Configuration Management | Use least privileged service accounts.<br>Do not store credentials in clear text.<br>Use strong authentication and authorization on administrative interfaces.<br>Do not use the Local Security Authority (LSA).<br>Avoid storing sensitive information in the web space.<br>Use only local administration. |
| Sensitive Data | Do not store secrets in software.<br>Encrypt sensitive data over the network.<br>Secure the channel. |
| Session Management | Partition site by anonymous, identified, and authenticated users.<br>Reduce session timeouts.<br>Avoid storing sensitive data in session stores.<br>Secure the channel to the session store.<br>Authenticate and authorize access to the session store. |
| Cryptography | Do not develop and use proprietary algorithms (e.g., XOR is not encryption, use platform-provided cryptography).<br>Avoid key management.<br>Periodically change keys. |
| Exception management | Use structured exception handling (e.g., use try/catch blocks).<br>Catch and wrap exceptions only if the operation adds value/information.<br>Do not reveal sensitive system or application information.<br>Do not log private data such as passwords. |
| Auditing and logging | Identify malicious behavior.<br>Know your baseline (e.g., know what good traffic looks like).<br>Use application instrumentation to expose behavior that can be monitored. |

Following is a list of exemplary countermeasures 208 with respect to more specific threats and/or attacks 206 in accordance with an aspect of the innovation. While this list includes specific countermeasures 208, it is to be appreciated that the list is not intended to be exhaustive and/or limiting in any way. As well, it is to be understood that other countermeasures 208 can exist to address each exemplary threat/attack 206 listed. These additional countermeasures 208 are to be included within the scope of this innovation and claims appended hereto. As such, these additional countermeasures 208 can be incorporated into the novel web application security frame component (104 of FIG. 1) without departing from the spirit and/or scope of the innovation and claims appended hereto.

| Threat/attack (206) | Countermeasures (208) |
|---|---|
| Spoofing user identity | Use strong authentication.<br>Do not store secrets (for example, passwords) in plaintext.<br>Do not pass credentials in plaintext over the wire.<br>Protect authentication cookies with Secure Sockets Layer (SSL). |
| Tampering with data | Use data hashing and signing.<br>Use digital signatures.<br>Use strong authorization.<br>Use tamper-resistant protocols across communication links.<br>Secure communication links with protocols that provide message integrity. |
| Repudiation | Create secure audit trails.<br>Use digital signatures. |
| Information disclosure | Use strong authorization.<br>Use strong encryption.<br>Secure communication links with protocols that provide message confidentiality.<br>Do not store secrets (for example, passwords) in plaintext. |
| Denial of service | Use resource and bandwidth throttling techniques.<br>Validate and filter input. |
| Elevation of privilege | Follow the principle of least privilege and use least privileged service accounts to run processes and access resources. |

Figure 4:
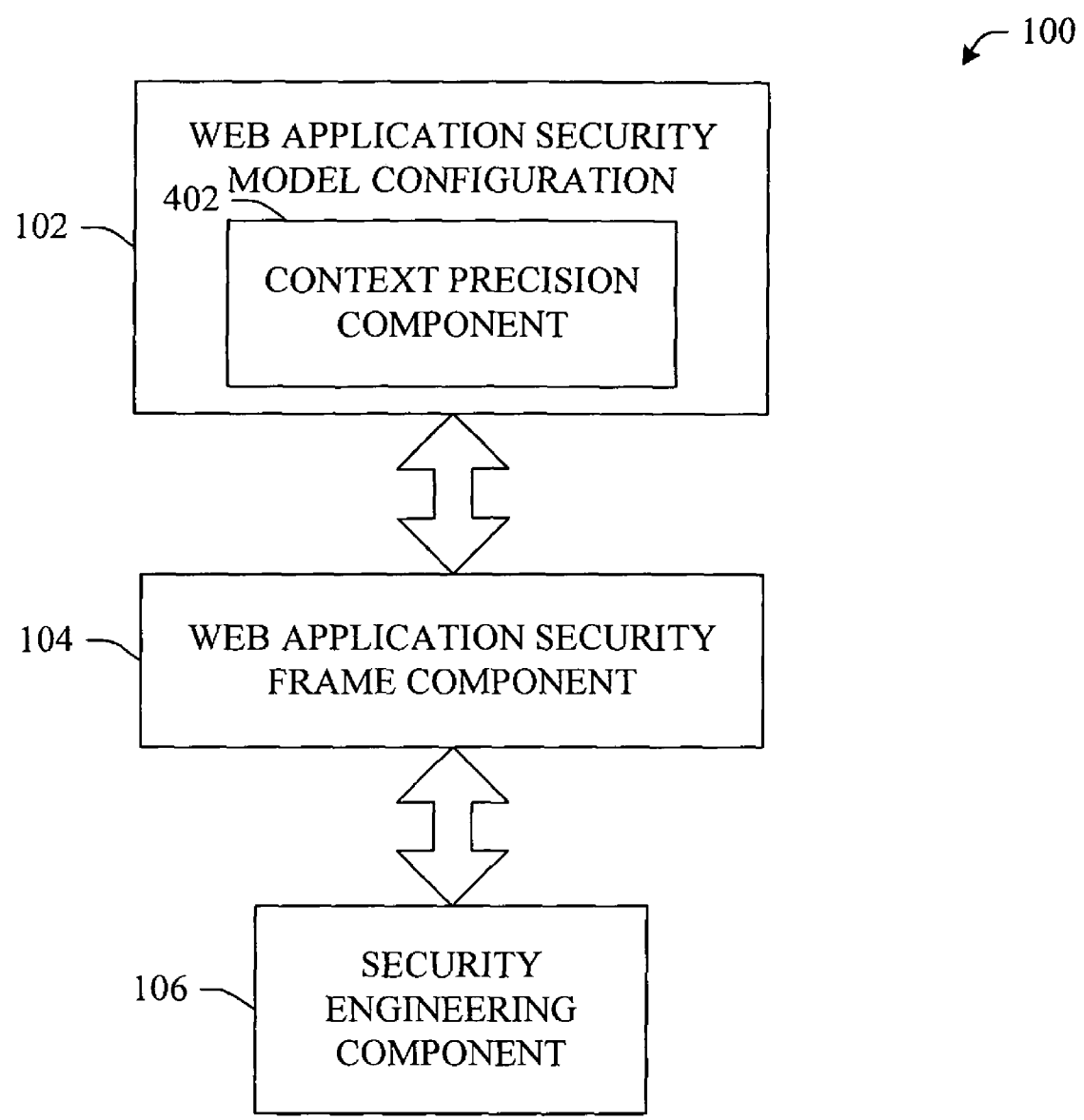
FIG. 4 illustrates a system that employs a context precision component that analyzes a web-based application in accordance with an aspect of the innovation.

Turning now to FIG. 4 and with continued reference to the example of the web application security frame component 104, a system 400 that facilitates identification of an appropriate web application security frame component 104 is shown. More particularly, the web application security model configuration component 102 can include a context precision component 402 which can automatically determine a specific web application type thereby facilitating determination of an appropriate web application security frame component 104 that matches the type.

The novel context precision component 402 is a tool that can clarify guidance and product design. In other words, the context precision component 402 can generate a set of categories 204 that facilitates highly relevant, highly specific guidance and actions. For example, one dimension can be web application type, another dimension can be scenario, another dimension can be project type, and yet another dimension can be life cycle. Accordingly, the context precision component 402 can determine a context of a particular web application environment thereby facilitating automatic generation of an appropriate web application security frame component 104. For example, the context precision component 402 can be employed to determine if an environment contains a specific web application type, for example, e-commerce, digital rights management based application, etc.

In still another aspect, the context precision component 402 can determine a particular application scenario, for example, Internet, intranet, etc. Using these dimensions, very specific guidance can be generated and incorporated within the novel web application security frame component 104.

Figure 5:
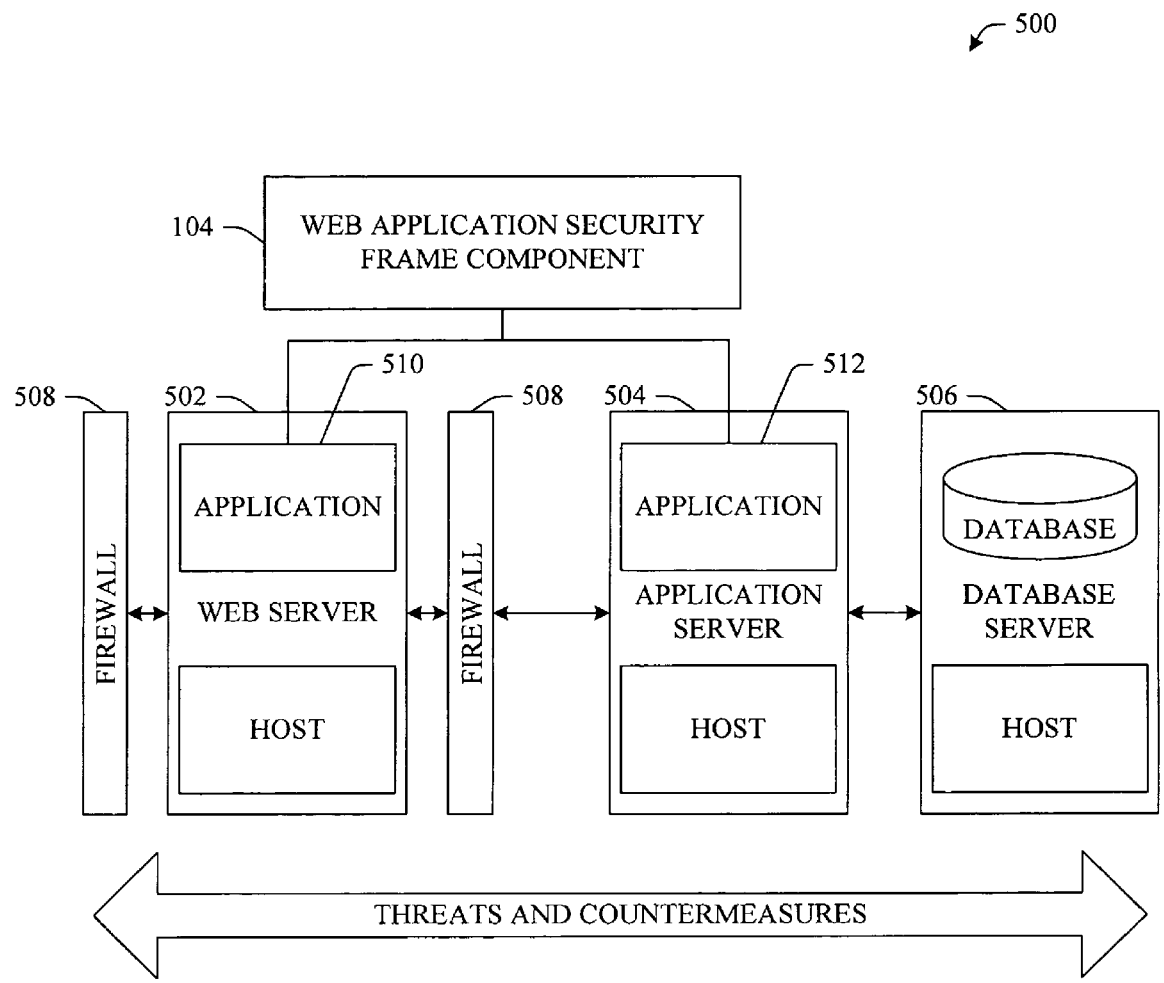
FIG. 5 illustrates an exemplary architecture of a web-based application system in accordance with an aspect of the innovation.

Turning now to FIG. 5, an exemplary architecture 500 of a web application scenario is shown. As illustrated, generally, the architecture 500 can include a web server 502, an application server 504 and a database server 506. The web server 502 can be protected by firewalls 508 as shown.

Moreover, the web server 502 and the application server 504 can house web applications 510, 512. In accordance with the novel functionality of the innovation, the web application security frame component 104 can employ the aforementioned security categories (204 of FIG. 2) to organize and address common security vulnerabilities, threats/attacks and countermeasures (206, 208, 210 of FIG. 2). In other words, this information and expertise can be incorporated into the web application security frame component 104 thereby providing security guidance by leveraging this expertise with respect to applications 510, 512.

With particular reference to the exemplary vulnerability category of input validation above, in one aspect, input validation refers to a security issue if an attacker discovers that an application (510, 512) makes unfounded assumptions about the type, length, format, or range of input data. In this exemplary scenario, the attacker can then supply carefully crafted input that compromises the application (510, 512). Although the specific examples described herein are directed toward the input validation category of vulnerability, it is to be appreciated that the other categories described above are to be included within the scope of this disclosure and claims appended hereto.

It is to be understood that when network and host level entry points are fully secured; the public interfaces exposed by the application become the only source of attack. As such, the input to the application (510, 512) is a means to both test the system and a way to execute code on an attacker's behalf. To this end, it is important not to blindly trust input(s) thereby reducing susceptibility to buffer overflows, cross-site scripting, SQL injection, canonicalization, etc.—each of which can be reduced by validating input(s).

By way of further example, buffer overflow vulnerabilities can lead to denial of service attacks or code injection. A denial of service attack causes a process crash. Code injection alters the program execution address to run an attacker's injected code.

A cross-site scripting (XSS) attack can cause arbitrary code to run in a user's browser while the browser is connected to a trusted web site. The attack targets the application's users and not the application itself, but it uses the application as the vehicle for the attack. Because the script code is downloaded by the browser from a trusted site, the browser has no way of knowing that the code is not legitimate. All in all, input validation can address XSS attacks.

Continuing with the example, an SQL injection attack exploits vulnerabilities in input validation to run arbitrary commands in the database. It can occur when the application uses input to construct dynamic SQL statements to access the database. It can also occur if the code uses stored procedures that are passed strings that contain unfiltered user input. Using the SQL injection attack, the attacker can execute arbitrary commands in the database. It will be appreciated that the issue can be magnified if the application 512 uses an over-privileged account to connect to the database. In this instance it is possible to use the database server 506 to run operating system commands and potentially compromise other servers, in addition to being able to retrieve, manipulate, and destroy data.

Different forms of input that resolve to the same standard name (the canonical name), is referred to as "canonicalization." Code can be particularly susceptible to canonicalization issues if it makes security decisions based on the name of a resource that is passed to the program as input. Files, paths, and URLs are resource types that are vulnerable to canonicalization because in each case there are many different ways to represent the same name. File names are also problematic.

All in all, by being aware of the typical approach used by attackers as well as their goals, a software engineer or other user can be more effective when applying countermeasures. It is also to be understood that it is particularly useful to use a goal-based approach when considering and identifying threats, and to use the STRIDE model to categorize threats based on the goals of the attacker, for example, to spoof identity, tamper with data, deny service, elevate privileges, and so on. This information can be employed within the novel web application security frame schema 104 thereby providing knowledge of these threats, together with the appropriate countermeasures, which provides essential information for the threat modeling process. Moreover, the novel context precision component 402 together with the threats and countermeasures schema 104 can enable identification of the threats that are specific to a particular scenario and prioritization of the threats based on the degree of risk they pose to the system.

As described supra, a set of secure design guidelines for application design can be provided via a novel web application security frame component (e.g., schema, template) 104. In the aspects described herein, the guidelines can be organized by common application vulnerability category including input validation, authentication, authorization, configuration management, sensitive data, session management, cryptography, exception management and auditing and logging. It is to be understood that these represent the key areas for web application security design, where mistakes are commonly made.

Continuing with the example described herein, web applications frequently present a complex set of security issues for architects, designers, and developers. The most secure and hack-resilient web applications are those that have been built from the ground up with security in mind. This proactive design can be employed via the novel web application security frame component 104 functionality described supra.

It will be appreciated that web applications present designers and developers with many challenges. The stateless nature of HTTP means that tracking per-user session state becomes the responsibility of the application. As a precursor to this, the application must be able to identify the user by using some form of authentication. Given that all subsequent authorization decisions are based on the user's identity, it is essential that the authentication process is secure and that the session handling mechanism used to track authenticated users is equally well protected. Designing secure authentication and session management mechanisms are just a couple of the issues facing web application designers and developers. Other challenges occur because input and output data passes over public networks. Preventing parameter manipulation and the disclosure of sensitive data are other top issues.

Referring again to the discussion of the input validation vulnerability category, input validation is a challenging issue and one primary burden of a solution that falls on application developers. However, proper input validation can be one of the strongest measures of defense against today's application attacks. Proper input validation is an effective countermeasure that can help prevent XSS, SQL injection, buffer overflows, and other input attacks.

Input validation is challenging because there is not a single answer for what constitutes valid input across applications or even within applications. Likewise, there is no single definition of malicious input. Adding to this difficulty is that what the application does with this input influences the risk of exploit. For example, do you store data for use by other applications or does your application consume input from data sources created by other applications?

As described above, conventionally, the software industry does not have a common (or systematic) technique to learn about, harvest, share principles, practices, patters, anti-patterns around security threats/attacks, vulnerabilities and/or countermeasures. As well, the relationships between different aspects of security problems are another issue. These and other scenarios are addressed by the novel web application security frame 104 described herein. In other words, this expertise can be incorporated and leveraged within the novel information model 104 described herein.

As described above with reference to countermeasures 210, in one aspect, the following practices can improve a web application's input validation:

Assume all input is malicious;
Centralize your approach;
Do not rely on client-side validation;
Be careful with canonicalization issues; and
Constrain, reject, and sanitize your input.

It is particularly prudent to assume that all inputs are malicious in nature. Input validation starts with a fundamental supposition that all input is malicious until proven otherwise. Whether input comes from a service, a file share, a user, or a database, the input should be validated if the source is outside the trust boundary. For example, if an external web service is called that returns strings, it is not possible to know if malicious commands are present or not. Similarly, if several applications write to a shared database, when data is read, it is difficult to determine if it is safe.

Input validation strategy can be considered a core element of the web application design. As such, expertise related thereto can be incorporated into the novel web application security frame component 104. In other words, the subject innovation can provide for a centralized approach to input validation, for example, by using common validation and filtering code in shared libraries. This can ensure that validation rules are applied consistently. It can also reduce development effort and assist with future maintenance.

Figure 6:
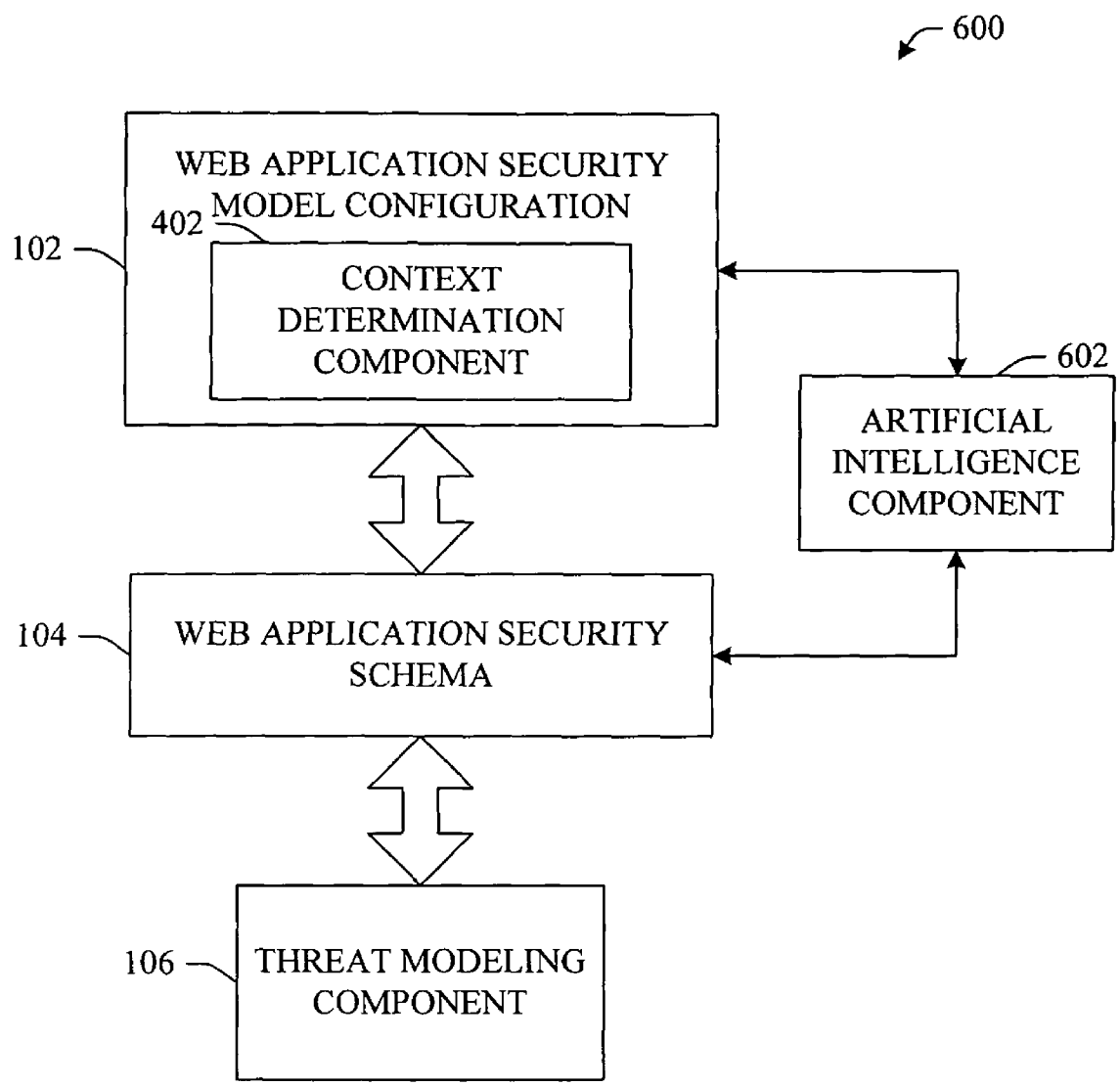
FIG. 6 illustrates an architecture including an artificial intelligence-based component that can automate functionality in accordance with an aspect of the novel innovation.

FIG. 6 illustrates a system 600 that employs an artificial intelligence (AI) component 602 which facilitates automating one or more features in accordance with the subject innovation. The subject innovation (e.g., determining a web application type, categories, etc.) can employ various AI-based schemes for carrying out various aspects thereof. For example, a process for determining a threats, vulnerabilities and/or countermeasures can be facilitated via an automatic classifier system and process.

A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria threats, vulnerabilities and/or countermeasures.

Figure 7:
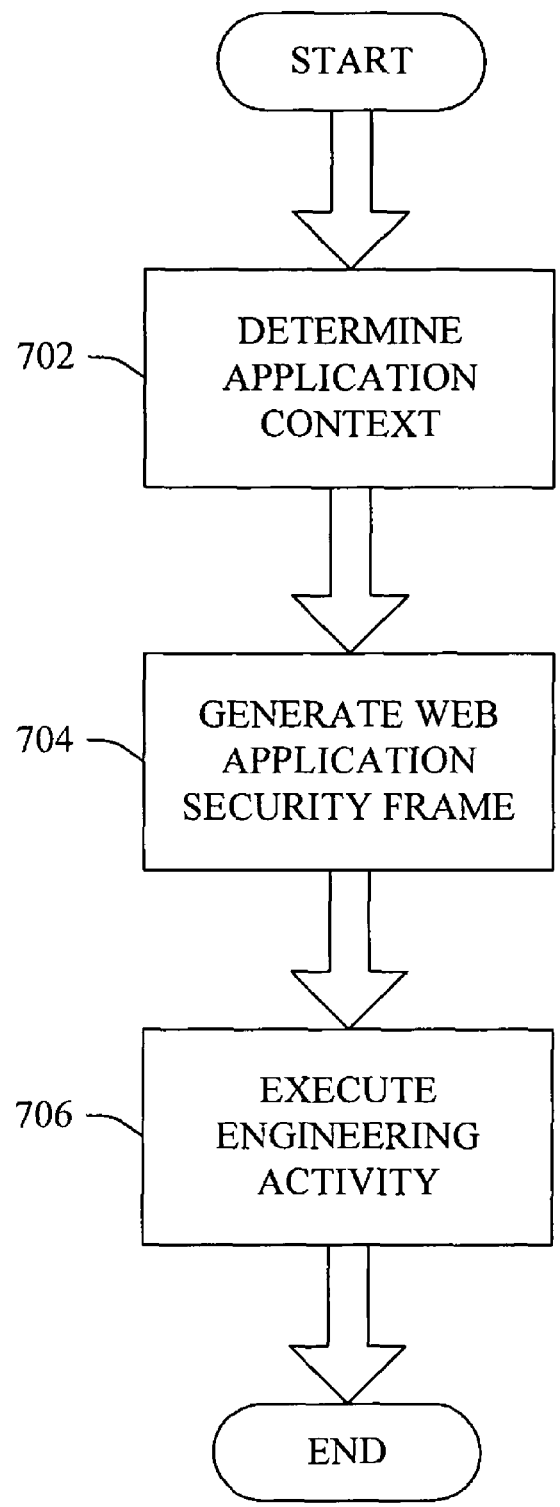
FIG. 7 illustrates an exemplary flow chart of procedures that facilitate determining a context, generating a web application security frame component and applying the web application security frame component to an engineering activity in accordance with an aspect of the innovation.

FIG. 7 illustrates a methodology of establishing an information model in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 702, the context of the web application can be determined of an application and/or system. In other words, in one aspect, a context precision mechanism can be employed to analyze a web application thereby establishing a web application type, project type, scenario, life cycle type, etc. The gathered information can be employed in order to generate a web application security frame at 704.

At 704, in one aspect of the innovation, a web application security frame can be established that defines one or more categories, vulnerabilities, threats/attacks and/or countermeasures. This web application security frame can facilitate incorporating expertise into an engineering activity at 706. For example, the web application security frame can facilitate incorporating expertise into a security modeling activity.

Figure 8:
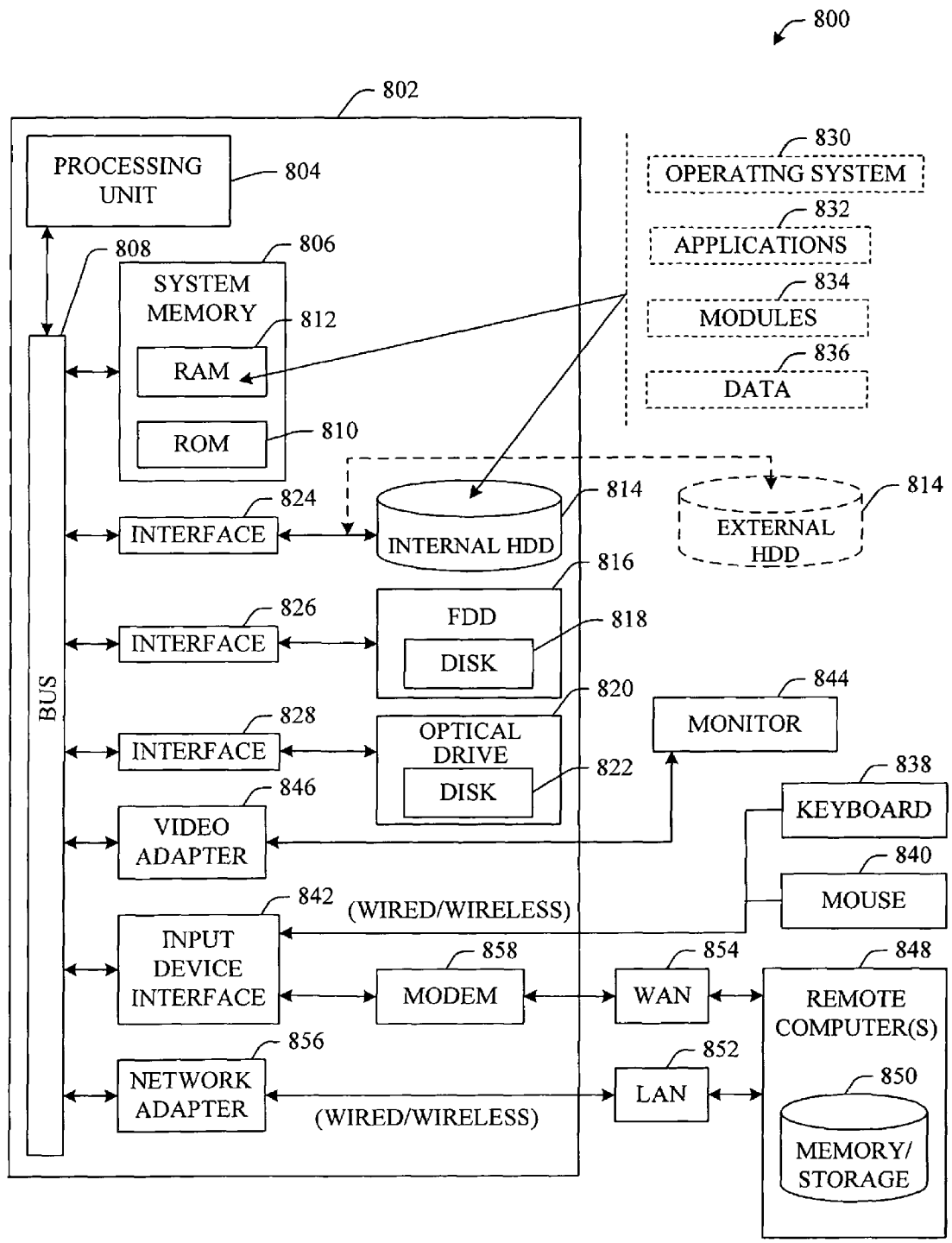
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects of the subject innovation, FIG. 8 and the following discussion are intended to provide a brief, general description of a suitable computing environment 800 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects of the innovation includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the innovation can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
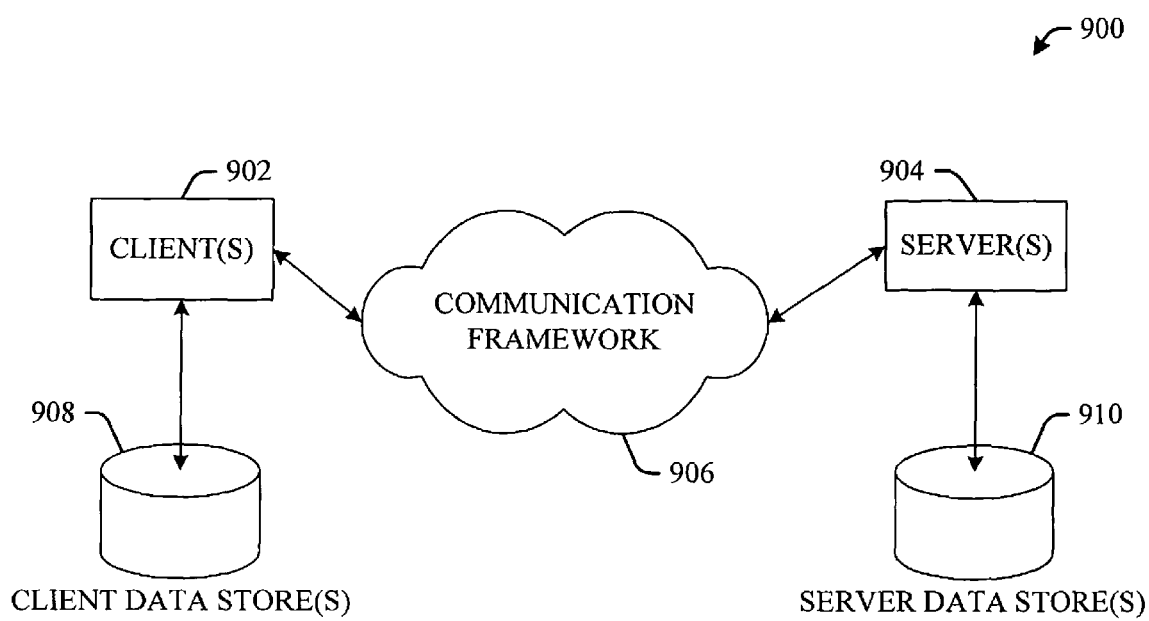
FIG. 9 illustrates a schematic block diagram of an exemplary computing environment in accordance with the subject innovation.

Referring now to FIG. 9, there is illustrated a schematic block diagram of an exemplary computing environment 900 in accordance with the subject innovation. The system 900 includes one or more client(s) 902. The client(s) 902 can be hardware and/or software (e.g., threads, processes, computing devices). The client(s) 902 can house cookie(s) and/or associated contextual information by employing the innovation, for example.

The system 900 also includes one or more server(s) 904. The server(s) 904 can also be hardware and/or software (e.g., threads, processes, computing devices). The servers 904 can house threads to perform transformations by employing the innovation, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method implemented with a computing system that includes a processor and memory storing instructions which, when executed by the processor, implement the method for incorporating security engineering expertise into one or more development engineering activities related to a development life cycle of a web-based application, by generating a web application security frame that identifies and categorizes security expertise specific to a context of the web-based application, the security expertise for use in the one or more development engineering activities for development of the web-based application, the one or more development engineering activities including executing a threat modeling activity for the web-based application, the method comprising:

determining a context of the web-based application, the context identifying environment information corresponding to the web-based application, including environment information corresponding to at least one of a web-based application type, a web-based application scenario, a web-based application project type or a web-based application life cycle type;

identifying engineering expertise relevant to the one or more development engineering activities, including the threat modeling activity, for the web-based application based at least in part upon the context, the engineering expertise identifying one or more categories that identify areas where security issues arise when developing web-based applications corresponding to the context of the web-based application, each category corresponding to:

engineering expertise identifying one or more vulnerabilities corresponding to the category;

engineering expertise identifying one or more threats or attacks against the vulnerabilities; and engineering expertise identifying one or more countermeasures against the threats or attacks;

generating, at the computing system, a web application security frame based on the identified engineering expertise that identifies and categorizes security expertise specific to the context of the web-based application, the web application security frame employing the one or more categories to organize the corresponding vulnerabilities, threats or attacks, and countermeasures;

identifying the one or more development engineering activities related to the development life cycle of the web-based application, including identifying the threat modeling activity;

executing, on the computing system, the threat modeling activity for the web-based application based at least in part upon the web application security frame, including the identified engineering expertise specific to the context of the web-based application; and receiving results from the threat modeling activity, and incorporating the results into the one or more development engineering activities into the development life cycle of the web-based application.

2. The method of claim 1, wherein the web application security frame identifies engineering expertise related to at least one of input validation, authentication, authorization, configuration management, session management, or auditing and logging.

3. The method of claim 1, wherein the web-based application type is an e-commerce web-based application.

4. The method of claim 1, wherein the web-based application type is a digital rights management application.

5. The method of claim 1, wherein the web-based application scenario is intranet.

6. The method of claim 1, wherein the web-based application scenario is internet.

7. The method of claim 1, wherein the engineering expertise includes expertise related to at least one of spoofing, tampering, repudiation, information disclosure, denial of service, or elevation.

8. A computer readable storage medium having stored thereon computer executable instructions that, when executed by a processor, perform the method of claim 1.

9. A computer-implemented system comprising a processor and one or more physical computer readable storage media operatively coupled to the processor, the computer readable storage media having stored thereon computer executable instructions that, when executed by the processor, implement the method of claim 1.

10. The computer-implemented system of claim 9, wherein the one or more security-related category is input validation, the vulnerability is a non-validated input operation, the attack is a cross-site scripting (XSS) operation, and the countermeasure is a constrain/reject/sanitize operation.

11. The computer-implemented system of claim 9, wherein the web application type is an e-commerce web application.

12. The computer-implemented system of claim 9, further comprising identifying the engineering expertise based at least in part upon a machine learning mechanism.

13. The computer-implemented system of claim 9, wherein the one or more categories include at least one of input and data validation, authentication, authorization, configuration management, sensitive data handling, session management, cryptography, exception management, or auditing and logging.

* * * * *